(12) United States Patent
Arman et al.

(10) Patent No.: US 6,881,354 B2
(45) Date of Patent: Apr. 19, 2005

(54) MULTICOMPONENT REFRIGERANT FLUIDS FOR LOW AND CRYOGENIC TEMPERATURES

(75) Inventors: Bayram Arman, Grand Island, NY (US); Neil Mark Prosser, Lockport, NY (US); M. Abdul-Aziz Rashad, Kenmore, NY (US); Henry Edward Howard, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 63 days.

(21) Appl. No.: 10/201,287

(22) Filed: Jul. 24, 2002

(65) Prior Publication Data

US 2003/0042463 A1 Mar. 6, 2003

Related U.S. Application Data

(60) Continuation-in-part of application No. 09/545,670, filed on Apr. 7, 2000, now Pat. No. 6,426,019, which is a division of application No. 09/222,809, filed on Dec. 30, 1998, now Pat. No. 5,076,372.

(51) Int. Cl.$^7$ ................................................ C09K 5/04
(52) U.S. Cl. ......................................... 252/67; 62/606
(58) Field of Search ..................................... 252/67, 68

(56) References Cited

U.S. PATENT DOCUMENTS

| | | | |
|---|---|---|---|
| 3,992,167 A | 11/1976 | Beddome | 62/18 |
| 5,157,925 A | 10/1992 | Denton et al. | 62/11 |
| 5,425,890 A | 6/1995 | Yudin et al. | 252/67 |
| 5,441,658 A | 8/1995 | Boyarsky et al. | 252/67 |
| 5,502,972 A | 4/1996 | Howard et al. | 62/23 |
| 5,579,654 A | 12/1996 | Longsworth et al. | 62/511 |
| 5,607,616 A | 3/1997 | Minor et al. | 252/67 |
| 5,622,644 A | 4/1997 | Stevenson et al. | 252/67 |
| 5,650,089 A | 7/1997 | Gage et al. | 252/67 |
| 5,687,574 A | 11/1997 | Longsworth et al. | 62/55.5 |
| 5,729,993 A | 3/1998 | Boiarski et al. | 62/175 |
| 5,736,063 A | 4/1998 | Richard et al. | 252/67 |
| 5,785,741 A | 7/1998 | Li et al. | 96/4 |
| 5,792,523 A | 8/1998 | McHugh, III | 428/34 |
| 5,976,222 A | 11/1999 | Yang et al. | 95/45 |
| 6,426,019 B1 * | 7/2002 | Acharya et al. | |

FOREIGN PATENT DOCUMENTS

| | | | |
|---|---|---|---|
| EP | 430169 | | 11/1990 |
| GB | 2291884 | | 7/1995 |
| WO | WO 94/17153 | * | 8/1994 |
| WO | WO 98/08912 | * | 3/1998 |

OTHER PUBLICATIONS

Vorster et al, "Wet Compression vs dry compression in heat pumps working with pure refrigerants or non–azeotropic binary mixtures for different heating applications" International Journal of Refrigeration, 23 (4), year 2000, pp 292–311.*

Bobbo et al., "Composition Shift of the Mixtures R–125/236fa(49./50.6) and R–509A" PRoceedings of the International Refrigeration Conference at Perdue, 7$^{th}$, Jul. 14–17, 1998, pp 87–92.*

* cited by examiner

Primary Examiner—Margaret Einsmann
(74) Attorney, Agent, or Firm—Stanley Ktorides

(57) ABSTRACT

Multicomponent refrigerant fluids for generating refrigeration, especially over a wide temperature range including cryogenic temperatures, which are advantageous over conventional refrigerant fluids especially for certain applications, and which are non-toxic, non-flammable and low or non-ozone-depleting and preferably are maintained in variable load form through compression, cooling, expansion and warming steps in a refrigeration cycle.

6 Claims, 2 Drawing Sheets

MULTICOMPONENT REFRIGERANT FLUIDS FOR LOW AND CRYOGENIC TEMPERATURES

This is a Continuation-in-Part of prior U.S. application(s) Ser. No. 09/545,670, Filing Date: Apr. 7, 2000 now U.S. Pat. No. 6,426,019 and which in turn is a Division of application Ser. No. 09/222,809, Filing Date Dec. 30, 1998 now U.S. Pat. No. 5,076,372.

TECHNICAL FIELD

This invention relates generally to refrigeration and, more particularly, to the use of multiple component refrigerant fluids useful for generating refrigeration. The invention is particularly useful for providing refrigeration down to cryogenic temperatures.

BACKGROUND ART

Refrigeration is conventionally generated by compressing and then expanding a refrigerant fluid within a refrigeration circuit. Well known examples of such conventional systems include refrigerators and air conditioners. Typically the refrigerant is a single component fluid which undergoes a phase change at a required temperature from a liquid to a gas thus making its latent heat of vaporization available for cooling purposes. The efficiency of the conventional system can be improved by using a multiple component fluid as the refrigerant which can provide variable amounts of refrigeration over a required temperature range. However, known multiple component fluid refrigeration cycles cannot effectively provide refrigeration over a large temperature range down to colder cryogenic temperatures. Moreover, most well known refrigerant fluids are toxic, flammable and/or ozone depleting.

Accordingly it is an object of this invention to provide multiple component refrigerant fluids which are useful for providing refrigeration down to cryogenic temperatures.

SUMMARY OF THE INVENTION

The above and other objects, which will become apparent to those skilled in the art upon a reading of this disclosure, are attained by the present invention, which is described in detail below.

As used herein the term "variable load refrigerant" means a mixture of two or more components in proportions such that the liquid phase of those components undergoes a continuous and increasing temperature change between the bubble point and the dew point of the mixture. The bubble point of the mixture is the temperature, at a given pressure, wherein the mixture is all in the liquid phase but addition of heat will initiate formation of a vapor phase in equilibrium with the liquid phase. The dew point of the mixture is the temperature, at a given pressure, wherein the mixture is all in the vapor phase but extraction of heat will initiate formation of a liquid phase in equilibrium with the vapor phase. Hence, the temperature region between the bubble point and the dew point of the mixture is the region wherein both liquid and vapor phases coexist in equilibrium. In the practice of this invention the temperature differences between the bubble point and the dew point for the variable load refrigerant is at least 10° K, preferably at least 20° K and most preferably at least 50° K.

As used herein the term "fluorocarbon" means one of the following: tetrafluoromethane ($CF_4$), perfluoroethane ($C_2F_6$), perfluoropropane ($C_3F_8$), perfluorobutane ($C_4F_{10}$), perfluoropentane ($C_5F_{12}$), perfluoroethene ($C_2F_4$), perfluoropropene ($C_3F_6$), perfluorobutene ($C_4F_8$), perfluoropentene ($C_5F_{10}$), perfluorohexane ($C_6F_{14}$), hexafluorocyclopropane (cyclo-$C_3F_6$) and octafluorocyclobutane (cyclo-$C_4F_8$).

As used herein the term "hydrofluorocarbon" means one of the following: fluoroform ($CHF_3$), pentafluoroethane ($C_2HF_5$), tetrafluoroethane ($C_2H_2F_4$), heptafluoropropane ($C_3HF_7$), hexafluoropropane ($C_3H_2F_6$), pentafluoropropane ($C_3H_3F_5$), tetrafluoropropane ($C_3H_4F_4$), nonafluorobutane ($C_4HF_9$), octafluorobutane ($C_4H_2F_8$), undecafluoropentane ($C_5HF_{11}$), decafluoropentane ($C_5H_2F_{10}$), methyl fluoride ($CH_3F$), difluoromethane ($CH_2F_2$), ethyl fluoride ($C_2H_5F$), difluoroethane ($C_2H_4F_2$), trifluoroethane ($C_2H_3F_3$), difluoroethene ($C_2H_2F_2$), trifluoroethene ($C_2HF_3$), fluoroethene ($C_2H_3F$), pentafluoropropene ($C_3HF_5$), tetrafluoropropene ($C_3H_2F_4$) trifluoropropene ($C_3H_3F_3$), difluoropropene ($C_3H_4F_2$), heptafluorobutene ($C_4HF_7$), hexafluorobutene ($C_4H_2F_6$) and nonafluoropentene ($C_5HF_9$)

As used herein the term "hydrochlorofluorocarbon" means one of the following: chlorodifluoromethane ($CHClF_2$), chlorofluoromethane ($CH_2ClF$), chloromethane ($CH_3Cl$), dichlorofluoromethane ($CHCl_2F$), chlorotetrafluoroethane ($C_2HClF_4$), chlorotrifluoroethane ($C_2H_2ClF_3$), chlorodifluoroethane ($C_2H_3ClF_2$), chlorofluoroethane ($C_2H_4ClF$), chloroethane ($C_2H_5Cl$), dichlorotrifluoroethane ($C_2HCl_2F_3$), dichlorodifluoroethane ($C_2H_2Cl_2F_2$), dichlorofluoroethane ($C_2H_3Cl_2F$), dichloroethane ($C_2H_4Cl_2$), trichlorofluoroethane ($C_2H_2Cl_3F$), trichlorodifluoroethane ($C_2HCl_3F_2$), trichloroethane ($C_2H_3Cl_3$), tetrachlorofluoroethane ($C_2HCl_4F$), chloroethene ($C_2H_3Cl$), dichloroethene ($C_2H_2Cl_2$), dichlorofluoroethene ($C_2H_2ClF$), dichloropentafluoropropane ($C_3HCl_2F_5$) and dichlorodifluoroethene ($C_2HClF_2$).

As used herein the term "fluoroether" means one of the following: trifluoromethyoxy-perfluoromethane ($CF_3$—O—$CF_3$), difluoromethoxy-perfluoromethane ($CHF_2$—O—$CF_3$), fluoromethoxy-perfluoromethane ($CH_2F$—O—$CF_3$), difluoromethoxy-difluoromethane ($CHF_2$—O—$CHF_2$), difluoromethoxy-perfluoroethane ($CHF_2$—O—$C_2F_5$), difluoromethoxy-1,2,2,2-tetrafluoroethane ($CHF_2$—O—$C_2HF_4$), difluoromethoxy-1,1,2,2-tetra-fluoroethane ($CHF_2$—O—$C_2HF_4$), perfluoroethoxyfluoromethane ($C_2F_5$—O—$CH_2F$), perfluoromethoxy-1,1,2-trifluoroethane ($CF_3$—O—$C_2H_2F_3$), perfluoromethoxy-1,2,2-trifluoroethane ($CF_3O$—$C_2H_2F_3$), perfluoroethoxy-methane ($C_2F_5$—O—$CH_3$), perfluoropropoxy-methane ($C_3F_7$—O—$CH_3$), perfluorobutoxy-methane ($C_4F_9$—O—$CH_3$), cyclo-1,1,2,2-tetrafluoropropylether (cyclo-$C_3H_2F_4$—O—), cyclo-1,1,3,3-tetrafluoropropylether (cyclo-$C_3H_2F_4$—O—), perfluoromethoxy-1,1,2,2-tetrafluoroethane ($CF_3$—O—$C_2HF_4$), cyclo-1,1,2,3,3-pentafluoropropylether (cyclo-$C_3H_5$—O—), perfluoromethoxy-perfluoroacetone ($CF_3$—O—$CF_2$—O—$CF_3$), perfluoromethoxy-perfluoroethane ($CF_3$—O—$C_2F_5$), perfluoromethoxy-1,2,2,2-tetrafluoroethane ($CF_3$—O—$C_2HF_4$), perfluoromethoxy-2,2,2-trifluoroethane ($CF_3$—O—$C_2H_2F_3$), cyclo-perfluoromethoxy-perfluoroacetone (cyclo-$CF_2$—O—$CF_2$—O—$CF_2$—) and cyclo-perfluoropropylether (cyclo-$C_3F_6$—O).

As used herein the term "atmospheric gas" means one of the following: nitrogen ($N_2$), argon (Ar), krypton (Kr), xenon (Xe), neon (Ne), carbon dioxide ($CO_2$), oxygen ($O_2$) and helium (He).

As used herein the term "hydrocarbon" means one of the following: hydrogen ($H_2$), methane ($CH_4$), ethane ($C_2H_6$), ethene ($C_2H_4$), propane ($C_3H_8$), propene ($C_3H_6$), butane ($C_4H_{10}$), butene ($C_4H_8$), cyclopropane ($C_3H_6$) and cyclobutane ($C_4H_8$).

As used herein the term "non-toxic" means not posing an acute or chronic hazard when handled in accordance with acceptable exposure limits.

As used herein the term "non-flammable" means either having no flash point or a very high flash point of at least 600° K.

As used herein the term "low-ozone-depleting" means having an ozone depleting potential less than 0.15 as defined by the Montreal Protocol convention wherein dichlorofluoromethane ($CCl_2F_2$) has an ozone depleting potential of 1.0.

As used herein the term "non-ozone-depleting" means having no component which contains a chlorine, bromine or iodine atom.

As used herein the term "normal boiling point" means the boiling temperature at 1 standard atmosphere pressure, i.e. 14.696 pounds per square inch absolute.

As used herein the term "cryogenic temperature" means a temperature of 150° K or less.

As used herein the term "indirect heat exchange" means the bringing of two fluids into heat exchange relation without any physical contact or intermixing of the fluids with each other.

As used herein the term "expansion" means to effect a reduction in pressure.

As used herein the terms "turboexpansion" and "turboexpander" mean respectively method and apparatus for the flow of high pressure fluid through a turbine to reduce the pressure and the temperature of the fluid thereby generating refrigeration.

DETAILED DESCRIPTION

Figure 1:
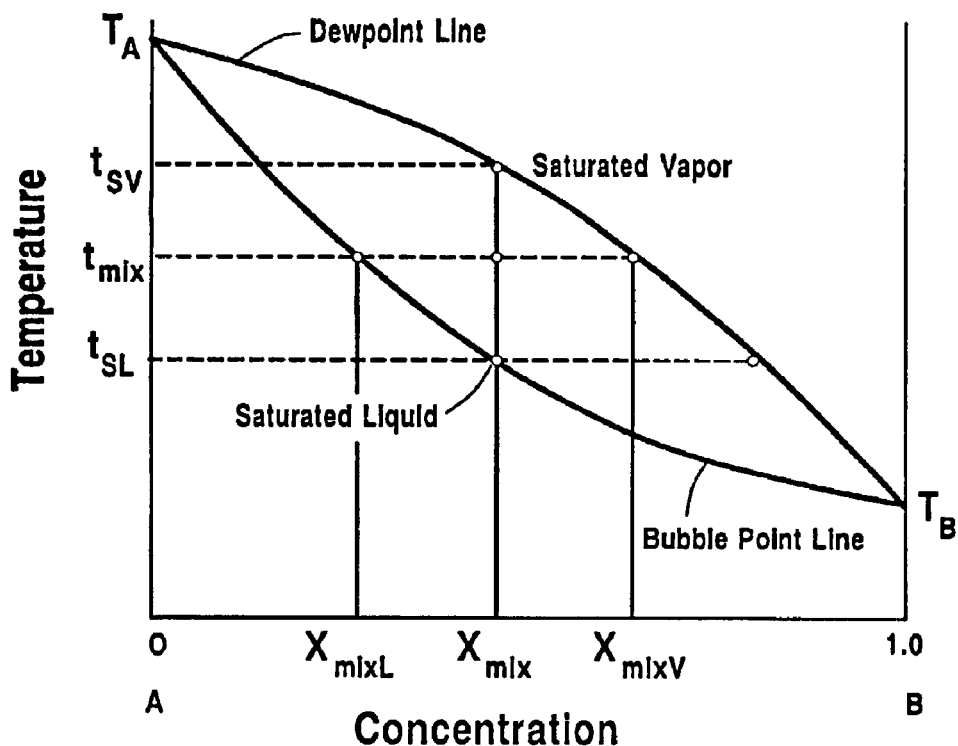
FIG. 1 is a generalized temperature versus concentration diagram for a variable load refrigerant mixture at a given pressure.

The invention comprises a refrigerant mixture composed of defined components in proportions which preferably form a variable load refrigerant mixture which may be used, for example, in a refrigeration cycle. The refrigerant mixture can be in all gas, gas/liquid, or all liquid phases depending on the process and the position within the process, i.e. the heat exchange position (top, middle, bottom). Preferably the cycle is a closed loop cycle. The refrigerant mixtures show a smooth temperature change accompanying a phase change. This is demonstrated in FIG. 1, a temperature versus concentration diagram of a variable load refrigerant mixture at a given pressure. With any given mix of components A and B (xmix) at temperature (tmix), two phases will exist, the composition of the saturated vapor (xmixv) will differ from the liquid in equilibrium with the vapor and the liquid will have the composition (xmixl). As the temperature is lowered, both the liquid phase composition and the vapor phase composition will change, each becoming enriched in component B. The condensing mixture is constantly changing its composition and thus its condensing temperature. It is this feature that makes it possible to improve the performance of a refrigeration cycle. The cycle improvement is related to the use of multiple components, each with its own normal boiling point and associated latent heat of vaporization. The proper selection of the refrigerant components, optimum concentrations in the mixture, along with operating pressure levels, and refrigerant cycles, allows the generation of variable amounts of refrigeration over the required temperature range. The provision of the variable refrigeration as a function of the temperature allows the optimum control of heat exchange temperature differences within the refrigeration user system and thereby reduces system energy requirements.

The variable load refrigerant mixture comprises at least one component from the group consisting of fluorocarbons, hydrofluorocarbons and fluoroethers and at least one component from the group consisting of fluorocarbons, hydrofluorocarbons, hydrochlorofluorocarbons, fluoroethers, atmospheric gases and hydrocarbons.

One preferred variable load refrigerant mixture comprises at least two components from the group consisting of fluorocarbons, hydrofluorocarbons and fluoroethers and at least one component from the group consisting of fluorocarbons, hydrofluorocarbons, hydrochlorofluorocarbons, fluoroethers, atmospheric gases and hydrocarbons.

Another preferred variable load refrigerant mixture comprises at least one fluorocarbon and at least one component from the group consisting of hydrofluorocarbons and atmospheric gases.

Another preferred variable load refrigerant mixture comprises at least one fluorocarbon, at least one hydrofluorocarbon and at least one atmospheric gas.

Another preferred variable load refrigerant mixture comprises at least three components from the group consisting of fluorocarbons, hydrofluorocarbons and fluoroethers and at least one component from the group consisting of fluorocarbons, hydrofluorocarbons, hydrochlorofluorocarbons, fluoroethers, hydrocarbons and atmospheric gases.

Another preferred variable load refrigerant mixture comprises at least two components from the group consisting of fluorocarbons, hydrofluorocarbons and fluoroethers and at least one atmospheric gas.

Another preferred variable load refrigerant mixture comprises at least two components from the group consisting of fluorocarbons, hydrofluorocarbons and fluoroethers, at least one atmospheric gas and at least one component from the group consisting of fluorocarbons, hydrofluorocarbons, hydrochlorofluorocarbons, fluoroethers, hydrocarbons and atmospheric gases.

Another preferred variable load refrigerant mixture comprises at least two components from the group consisting of fluorocarbons, hydrofluorocarbons and fluoroethers and at least two different atmospheric gases.

Another preferred variable load refrigerant mixture includes at least one fluoroether, i.e. comprises at least one fluoroether and at least one component from the group consisting of fluorocarbons, hydrofluorocarbons, fluoroethers, hydrochlorofluorocarbons, hydrocarbons and atmospheric gases.

In one preferred embodiment the refrigerant mixture contains no hydrochlorofluorocarbons. In another preferred embodiment the refrigerant mixture contains no hydrocarbons. Most preferably the refrigerant mixture contains neither hydrochlorofluorocarbons nor hydrocarbons. Most preferably the variable load refrigerant is non-toxic, non-flammable and non-ozone-depleting and every component of the refrigerant mixture is either a fluorocarbon, hydrofluorocarbon, fluoroether or atmospheric gas.

In one preferred embodiment the variable load refrigerant consists solely of fluorocarbons. In another preferred embodiment the variable load refrigerant consists solely of fluorocarbons and hydrofluorocarbons. In another preferred embodiment the variable load refrigerant consists solely of fluorocarbons and atmospheric gases. In another preferred embodiment the variable load refrigerant consists solely of fluorocarbons, hydrofluorocarbons and fluoroethers. In another preferred embodiment the variable load refrigerant consists solely of fluorocarbons, fluoroethers and atmospheric gases. Most preferably every component of the variable load refrigerant is either a fluorocarbon, hydrofluorocarbon, fluoroether or atmosphere gas.

The invention is particularly advantageous for use in efficiently reaching cryogenic temperatures from ambient temperatures. Tables 1–15 list preferred examples of variable load refrigerant mixtures. The concentration ranges given in the Tables are in the mole percent. The examples shown in Tables 1–5 are preferred mixtures for generating refrigeration above about 200° K and the examples shown in Tables 6–15 are preferred mixtures for generating refrigeration below about 200° K.

TABLE 1

| COMPONENT | CONCENTRATION RANGE |
|---|---|
| $C_5F_{12}$ | 5–35 |
| $C_4F_{10}$ | 0–25 |
| $C_3F_8$ | 10–50 |
| $C_2F_6$ | 10–60 |
| $CF_4$ | 0–25 |

TABLE 2

| COMPONENT | CONCENTRATION RANGE |
|---|---|
| $C_5F_{12}$ | 5–35 |
| $C_3H_3F_6$ | 0–25 |
| $C_3F_8$ | 10–50 |
| $CHF_3$ | 10–60 |
| $CF_4$ | 0–25 |

TABLE 3

| COMPONENT | CONCENTRATION RANGE |
|---|---|
| $C_3H_3F_5$ | 5–35 |
| $C_3H_3F_6$ | 0–25 |
| $C_2H_2F_4$ | 5–20 |
| $C_2HF_5$ | 5–20 |
| $C_2F_6$ | 10–60 |
| $CF_4$ | 0–25 |

TABLE 4

| COMPONENT | CONCENTRATION RANGE |
|---|---|
| $C_3F_4$—O—$CHF_3$ | 5–35 |
| $C_4F_{10}$ | 0–25 |
| $CF_3$—O—$CHF_2$ | 10–25 |
| $CF_3$—O—$CF_3$ | 0–20 |

TABLE 4-continued

| COMPONENT | CONCENTRATION RANGE |
|---|---|
| $C_2F_6$ | 10–60 |
| $CF_4$ | 0–25 |

TABLE 5

| COMPONENT | CONCENTRATION RANGE |
|---|---|
| $C_3F_7$—O—$CH_3$ | 5–35 |
| $C_3H_2F_6$ | 0–25 |
| $CF_3$—O—$CHF_2$ | 10–50 |
| $CHF_3$ | 10–60 |
| $CF_4$ | 0–25 |

TABLE 6

| COMPONENT | CONCENTRATION RANGE |
|---|---|
| $CF_5F_{12}$ | 5–25 |
| $C_4F_{10}$ | 0–15 |
| $C_3F_8$ | 10–40 |
| $C_2F_6$ | 0–30 |
| $CF_4$ | 10–50 |
| Ar | 0–40 |
| $N_2$ | 10–80 |

TABLE 7

| COMPONENT | CONCENTRATION RANGE |
|---|---|
| $C_3H_3F_5$ | 5–25 |
| $C_4F_{10}$ | 0–15 |
| $C_3F_8$ | 10–40 |
| $CHF_3$ | 0–30 |
| $CF_4$ | 10–50 |
| Ar | 0–40 |
| $N_2$ | 10–80 |

TABLE 8

| COMPONENT | CONCENTRATION RANGE |
|---|---|
| $C_3H_3F_5$ | 5–25 |
| $C_3H_3F_6$ | 0–15 |
| $C_2H_2F_4$ | 0–20 |
| $C_2HF_5$ | 5–20 |
| $C_2F_6$ | 0–30 |
| $CF_4$ | 10–50 |
| Ar | 0–40 |
| $N_2$ | 10–80 |

TABLE 9

| COMPONENT | CONCENTRATION RANGE |
|---|---|
| $C_3F_7$—O—$CH_3$ | 5–25 |
| $C_4H_{10}$ | 0–15 |
| $CF_3$—O—$CHF_2$ | 10–40 |
| $CF_3$—O—$CF_3$ | 0–20 |
| $C_2F_6$ | 0–30 |
| $CF_4$ | 10–50 |
| Ar | 0–40 |
| $N_2$ | 10–80 |

TABLE 10

| COMPONENT | CONCENTRATION RANGE |
|---|---|
| $C_3H_3F_5$ | 5–25 |
| $C_3H_2F_6$ | 0–15 |
| $CF_3$—O—$CHF_2$ | 10–40 |
| $CHF_3$ | 0–30 |
| $CF_4$ | 0–25 |
| Ar | 0–40 |
| $N_2$ | 10–80 |

TABLE 11

| COMPONENT | CONCENTRATION RANGE |
|---|---|
| $C_5F_{12}$ | 5–25 |
| $C_4F_{10}$ | 0–15 |
| $C_3F_8$ | 10–40 |
| $C_2F_6$ | 0–30 |
| $CF_4$ | 10–50 |
| Ar | 0–40 |
| $N_2$ | 10–80 |
| Ne | 0–10 |
| He | 0–10 |

TABLE 12

| COMPONENT | CONCENTRATION RANGE |
|---|---|
| $C_3H_3F_5$ | 5–25 |
| $C_4F_{10}$ | 0–15 |
| $C_3F_8$ | 10–40 |
| $CHF_3$ | 0–30 |
| $CF_4$ | 10–50 |
| Ar | 0–40 |
| $N_2$ | 10–80 |
| Ne | 0–10 |
| He | 0–10 |

TABLE 13

| COMPONENT | CONCENTRATION RANGE |
|---|---|
| $C_3H_3F_5$ | 5–25 |
| $C_3H_2F_6$ | 0–15 |
| $C_2H_2F_4$ | 5–20 |
| $C_2HF_5$ | 5–20 |
| $C_2F_6$ | 0–30 |
| $CF_4$ | 10–50 |
| Ar | 0–40 |
| $N_2$ | 10–80 |
| Ne | 0–10 |
| He | 0–10 |

TABLE 14

| COMPONENT | CONCENTRATION RANGE |
|---|---|
| $C_3F_7$—O—$CH_3$ | 5–25 |
| $C_4F_{10}$ | 0–15 |
| $CF_3$—O—$CHF_2$ | 10–40 |
| $CF_3$—O—$CF_3$ | 0–20 |
| $C_2F_6$ | 0–30 |
| $CF_4$ | 10–50 |
| Ar | 0–40 |
| $N_2$ | 10–80 |
| Ne | 0–10 |
| He | 0–10 |

TABLE 15

| COMPONENT | CONCENTRATION RANGE |
|---|---|
| $C_3H_3F_5$ | 5–25 |
| $C_3H_2F_6$ | 0–15 |
| $CF_3$—O—$CHF_3$ | 10–40 |
| $CHF_3$ | 0–30 |
| $CF_4$ | 0–25 |
| Ar | 0–40 |
| $N_2$ | 10–80 |
| Ne | 0–10 |
| He | 0–10 |

One embodiment of the invention, which is particularly useful for generating refrigeration for use in a liquefier, is a multicomponent refrigerant fluid comprising from 0.1 to 50 mole percent, preferably from 16 to 31 mole percent, nitrogen, from 22 to 55 mole percent, preferably from 24 to 40 mole percent, tetrafluoromethane, and from 7 to 48 mole percent, preferably from 11 to 23 mole percent, pentafluoroethane and/or perfluoropropane. By use of the term "and/or" it is meant that, in this instance, the third component, which is present in a concentration of from 7 to 48 percent, may be comprised entirely of pentafluoroethane, or entirely of perfluoropropane, or may be a mixture of pentafluoroethane and perfluoropropane. The term "and/or" is used in a similar manner for other formulations of the invention which are listed below. A term which is equivalent to the term "and/or" as used herein is the term "at least one of". This embodiment of the invention may also contain argon in a concentration up to 48 mole percent, perfluoropropoxymethane in a concentration up to 30 mole percent, fluoroform in a concentration up to 25 mole percent, perfluorobutane in a concentration up to 20 mole percent, and perfluoropentane in a concentration up to 30 mole percent.

Another embodiment of the invention, which is particularly useful for generating refrigeration for use in a cryogenic air separation plant, is a multicomponent refrigerant fluid comprising from 0.1 to 45 mole percent argon, from 20 to 55 mole percent tetrafluoromethane, and from 7 to 48 mole percent pentafluoroethane and/or perfluoropropane. This embodiment of the invention may also contain nitrogen in a concentration up to 42 mole percent, perfluoropoxymethane in a concentration up to 30 mole percent, fluoroform in a concentration up to 25 mole percent, perfluorobutane in a concentration up to 15 mole percent, and perfluoropentane in a concentration up to 30 mole percent.

Another embodiment of the invention, which is particularly useful for generating refrigeration for use in such applications as forecooling and food freezing, is a multicomponent refrigerant fluid comprising from 15 to 85 mole percent tetrafluoromethane and from 15 to 85 mole percent pentafluoroethane and/or perfluoropropane. This embodiment of the invention may also contain nitrogen in a concentration up to 25 mole percent, argon in a concentration up to 25 mole percent, krypton in a concentration up to 25 mole percent, perfluoropropoxy-methane in a concentration up to 30 mole percent, pentafluoropropane in a concentration up to 30 mole percent, fluoroform in a concentration up to 25 mole percent, perfluorobutane in a concentration up to 15 mole percent and perfluoropentane in a concentration up to 30 mole percent.

Another embodiment of the invention, which is particularly useful for generating low temperature though not cryogenic temperature refrigeration, such as at a temperature within the range of from 200K to 260K, is a multicomponent refrigerant fluid comprising from 5 to 95 mole percent pentafluoroethane and/or perfluoropropane, and from 5 to 95 mole percent, perfluoropropoxy-methane and/or pentafluoropropane and/or hexafluoropropane. This embodiment of the invention may also contain nitrogen in a concentration up to 10 mole percent, argon in a concentration up to 10 mole percent, fluoroform in a concentration up to 25 mole percent, tetrafluoromethane in a concentration up to 10 mole percent, and tetrafluoroethane in a concentration up to 20 mole percent.

Another embodiment of the invention, which is particularly useful for generating low temperature though not cryogenic temperature refrigeration, such as at a temperature within the range of from 200K to 260K, is a multicomponent refrigerant fluid comprising from 20 to 65 mole percent pentafluoroethane, from 20 to 65 mole percent difluoromethane and from 7 to 55 mole percent pentafluoropropane. This embodiment of the invention may also contain nitrogen in a concentration up to 10 mole percent, argon in a concentration up to 10 mole percent, fluoroform in a concentration up to 25 mole percent, tetrafluoromethane in a concentration up to 10 mole percent, and tetrafluoroethane in a concentration up to 20 mole percent.

Figure 2:
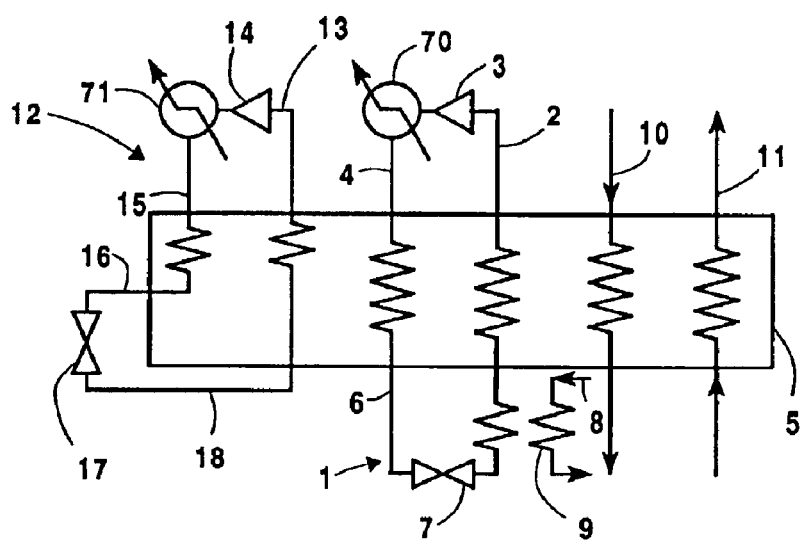
FIG. 2 is a schematic representation of a system wherein the invention may be practiced.

FIG. 2 illustrates one refrigeration cycle wherein the invention may be practiced. Referring now to FIG. 2, the refrigerant mixture of this invention recirculates in a refrigeration circuit or loop 1. Refrigerant 2 is compressed by passage through compressor 3 to form compressed refrigerant fluid 4, cooled to near ambient temperature by passage through aftercooler 70, and then cooled and preferably at least partially liquefied by passage through heat exchanger 5. Unless otherwise specified, each heat exchange step illustrated in the Drawings is an indirect heat exchange step. Cooled refrigerant fluid 6 is then throttled, i.e. expanded, through valve 7 to a lower pressure. The pressure expansion can be accomplished by a turbine, such as a gas expansion, two-phase expansion, or liquid expansion turbine. The refrigeration produced can be utilized at a single or narrow temperature level by cooling a fluid 8 by indirect heat exchange in heat exchanger 9, or can be utilized over a much wider temperature range in heat exchanger 5. The refrigeration may be used to cool one or more fluid streams passing through heat exchanger 5 as illustrated by countercurrent stream 10 and cocurrent stream 11. Although on an overall basis, stream 11 is shown as being heated in exchanger 5, on a local basis it can be cooled within exchanger 5. The resulting warmed refrigerant mixture is then passed as stream 2 to compressor 3 and the cycle repeats.

The cooling arrangement could also include a precooler circuit or loop 12 wherein a refrigerant mixture 13 of this invention designed to provide refrigeration at intermediate temperature levels is compressed in precooler compressor 14, cooled to ambient temperature in aftercooler 71, and the resulting compressed fluid 15 is cooled in heat exchanger 5. The resulting cooled fluid 16 is throttled through a valve or a suitable turbine 17 to generate refrigeration and resulting lower temperature refrigerant fluid 18 is warmed and then cycled as stream 13 to compressor 14.

Figure 3:
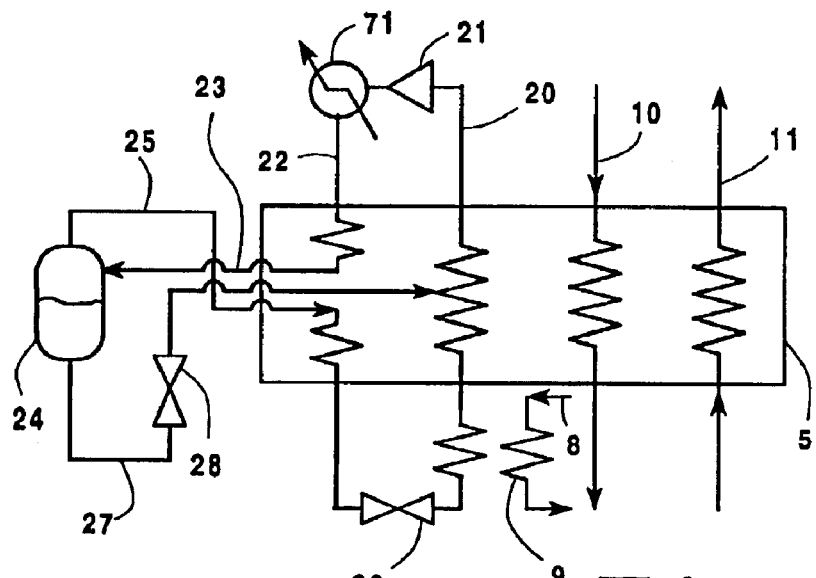
FIG. 3 is a schematic representation of another system wherein the invention may be practiced.

The effect of the precooler loop can be accomplished by intermediate removal of some of the refrigerant mixture and recycling of liquid as illustrated in FIG. 3. The liquid recycle feature provides process flexibility in matching the refrigerant mixtures to the required temperature ranges and avoids unnecessary cooling and potential freezing of the liquid refrigerant. The numerals in FIG. 3 are the same as those in FIG. 2 for the common elements which will not be described again in detail. Referring now to FIG. 3, refrigerant fluid 20 is compressed by passage through compressor 21 to form compressed refrigerant fluid 22 which is cooled of the heat of compression to near ambient temperature by aftercooler 71 and then cooled and partially condensed by partial traverse of heat exchanger 5. Cooled two phase refrigerant mixture 23 is passed into phase separator 24 wherein it is separated into vapor and liquid. Vapor 25 is further cooled through heat exchanger 5, throttled through valve 26 and warmed by passage through heat exchanger 9 and/or 5. Liquid 27 is passed through valve 28 and then vaporized by passage through heat exchanger 5. In the embodiment illustrated in FIG. 3 the liquid is combined with the lower pressure vapor which is throttled through valve 26 prior to vaporization. The resulting warmed refrigerant mixture is then returned as stream 29 to compressor 21 and the refrigeration cycle begins anew. Although a single phase separation is illustrated, it is understood that multiple phase separations at different temperature levels could be utilized to provide staged precooling circuits.

The invention is particularly useful for providing refrigeration from ambient temperature down to cryogenic temperature, even down to as low a temperature as 5° K. While the invention may be used to provide such refrigeration over this entire temperature range in a single loop, it is generally preferable to provide this refrigeration in a plurality of cascade loops. The use of multiple cascade loops allows each circuit to provide refrigeration over a selected temperature range. Thereby the selection of a suitable refrigerant mixture is facilitated, since the selected mixture need only be operable over a more limited temperature range. Note that although each cascade circuit is intended to provide refrigeration primarily over its associated temperature range, it may also provide some refrigeration at higher temperature levels. Thus the cascade circuits may somewhat overlap each other with respect to providing refrigeration at a given temperature range.

Figure 4:
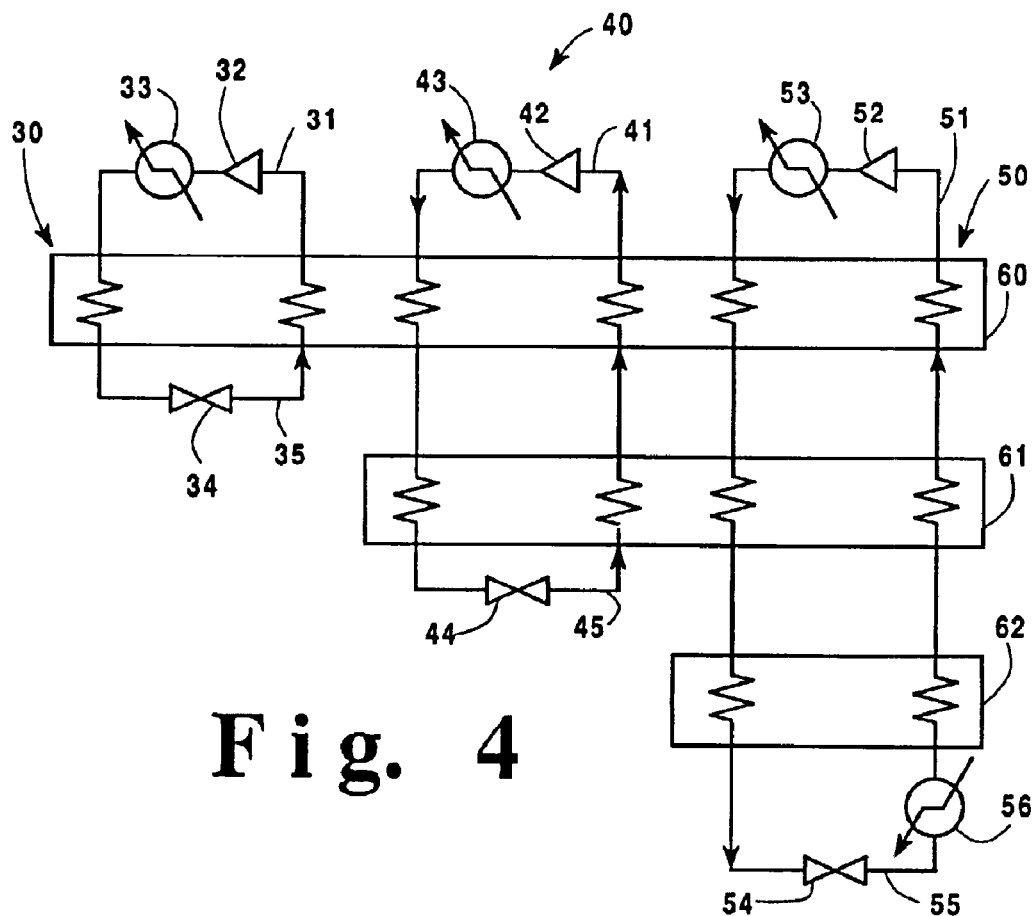
FIG. 4 is a schematic representation of a three loop system wherein the invention may be used to provide refrigeration over a wide temperature range.

The cascade loop system is illustrated in and discussed in conjunction with FIG. 4. Referring now to FIG. 4 higher temperature refrigerant fluid comprising two or more of, for example, tetrafluoromethane, fluoroform, perfluoropropane, perfluorobutane, pentafluoropropane, tetrafluoroethane, difluoromethoxy-difluoromethane and perfluoropentane, recirculates in higher temperature loop 30 wherein refrigeration is provided from the ambient temperature of about 300° K down to about 200° K. The higher temperature refrigerant fluid 31 at about 300° K is compressed in compressor 32, cooled through cooler 33 and heat exchanger 60 and throttled through valve 34 to produce lower temperature refrigerant fluid 35 at about 200° K. The lower temperature refrigerant fluid is then warmed back to about 300° K and returned as stream 31 to compressor 32.

Intermediate temperature refrigerant fluid, which may contain nitrogen and/or argon in addition to one or more of the components recited for the higher temperature fluid, recirculates in intermediate temperature loop 40 wherein refrigeration is provided from about 200° K down to about 100° K. The intermediate temperature refrigerant fluid 41 is compressed in compressor 42, cooled through cooler 43 and heat exchangers 60 and 61, and throttled through valve 44 to produce lower temperature refrigerant fluid 45 at about 100° K which is warmed and then returned as stream 41 to compressor 42.

Very low temperature refrigerant fluid comprising two or more of nitrogen, argon, helium, neon and hydrogen recirculates in very low temperature loop 50 wherein the temperature level is brought from about 100° K to about 20° K or even lower. The very low temperature refrigerant fluid 51 is compressed in compressor 52, cooled through cooler 53 and heat exchangers 60, 61 and 62, and throttled through valve 54 to produce lower temperature refrigerant fluid 55 at about 20° K or lower which is warmed by passage through warmer 56 and heat exchangers 62, 61 and 60 and then returned as stream 51 to compressor 52.

The invention is especially useful for providing refrigeration over a wide temperature range, particularly one which encompasses cryogenic temperatures. In a preferred embodiment of the invention each of the components of the refrigerant mixture has a normal boiling point which differs by at least 20 degrees Kelvin from the normal boiling point of every other component in that refrigerant mixture. This enhances the effectiveness of providing refrigeration over a wide temperature range, particularly one which encompasses cryogenic temperatures. In a particularly preferred embodiment of the invention, the normal boiling point of the highest boiling component of the multicomponent refrigerant fluid is at least 50° K, preferably at least 100° K, most preferably at least 200° K, greater than the normal boiling point of the lowest boiling component of the multicomponent refrigerant fluid.

The components and their concentrations which make up the refrigerant mixture of this invention preferably are such as to form a variable load refrigerant mixture and preferably maintain such a variable load characteristic throughout the whole temperature range of the method of the invention. This markedly enhances the efficiency with which the refrigeration can be generated and utilized over such a wide temperature range. The defined group of components has an added benefit in that they can be used to form mixtures which are non-toxic, non-flammable and low or non-ozone-depleting. This provides additional advantages over conventional refrigerants which typically are toxic, flammable and/or ozone-depleting.

One preferred variable load refrigerant mixture which is non-toxic, non-flammable and non-ozone-depleting comprises two or more components from the group consisting of $C_3F_7$—O—$CH_3$, $C_4H_5F_5$, $C_4H_4F_6$, $C_4F_4$—O—$CH_3$, $C_5H_2F_{10}$, $C_5HF_{11}$, $C_5F_{12}$, $CHF_2$—O—$C_2HF_4$, $C_4HF_9$, $C_3H_3F_5$, $C_2F_5$—O—$CH_2F$, $C_3H_2F_6$, $CHF_2$—O—$CHF_2$, $C_4F_{10}$, $CF_3$—O—$C_2H_2F_3$, $C_3HF_7$, $CH_2F$—O—$CF_3$, $C_2H_2F_4$, $CHF_2$—O—$CF_3$, $C_3F_8$, $C_2HF_5$, $CF_3$—O—$CF_3$, $C_2F_6$, $CHF_3$, $CF_4$, $O_2$, Ar, $N_2$, Ne and He.

The invention may be used to generate refrigeration for a large number of uses, especially for cryogenic applications. Among such uses one can name gas separation processes such as cryogenic air separations and other cryogenic separations and natural gas upgrading, liquefiers, food freezing, vent gas recovery, heat pumping, cryogenic liquid storage and transport vessel recondensation, crystallization, solidification, low temperature grinding, chemicals storage and transport, biological and medical material storage and transport, and refrigerated rooms, i.e. cold rooms utilized for materials handling and storage.

Although the invention has been described in detail with reference to certain preferred embodiments, those skilled in the art will recognize that there are other embodiments of the invention within the spirit and the scope of the claims.

What is claimed is:

1. A multicomponent refrigerant fluid comprising from 5 to 95 mole percent of at least one of pentafluorethane and perfluoropropane, and from 5 to 95 mole percent of at least one of perfluoropropoxymethane and pentafluoropropane and further comprising fluoroform in a concentration up to 25 mole percent.

2. A multicomponent refrigerant fluid comprising from 5 to 95 mole percent of at least one of pentafluoroethane and perfluoropropane, and from 5 to 95 mole percent of at least one of perfluoropropoxymethane and pentafluoropropane and further comprising tetrafluoromethane in a concentration of from 10 to 50 mole percent.

3. A multicomponent refrigerant fluid comprising from 5 to 95 mole percent of at least one of pentafluoroethane and perfluoropropane, and from 5 to 95 mole percent of at least one of perfluoropropoxymethane and pentafluoropropane and further comprising argon in a concentration up to 40 mole percent.

4. A multicomponent refrigerant fluid comprising from 5 to 95 mole percent of at least one of pentafluoroethane and perfluoropropane, and from 5 to 95 mole percent of at least one of perfluoropropoxymethane and pentafluoropropane and further comprising nitrogen in a concentration of from 10 to 80 mole percent.

5. A multicomponent refrigerant fluid comprising from 5 to 95 mole percent of at least one of pentafluoroethane and perfluoropropane, and from 5 to 95 mole percent of at least one of perfluoropropoxymethane and pentafluoropropane and further comprising neon in a concentration up to 10 mole percent.

6. A multicomponent refrigerant fluid comprising from 5 to 95 mole percent of at least one of pentafluoroethane and perfluoropropane, and from 5 to 95 mole percent of at least one of perfluoropropoxymethane and pentafluoropropane and further comprising helium in a concentration up to 10 mole percent.

* * * * *